UNITED STATES PATENT OFFICE.

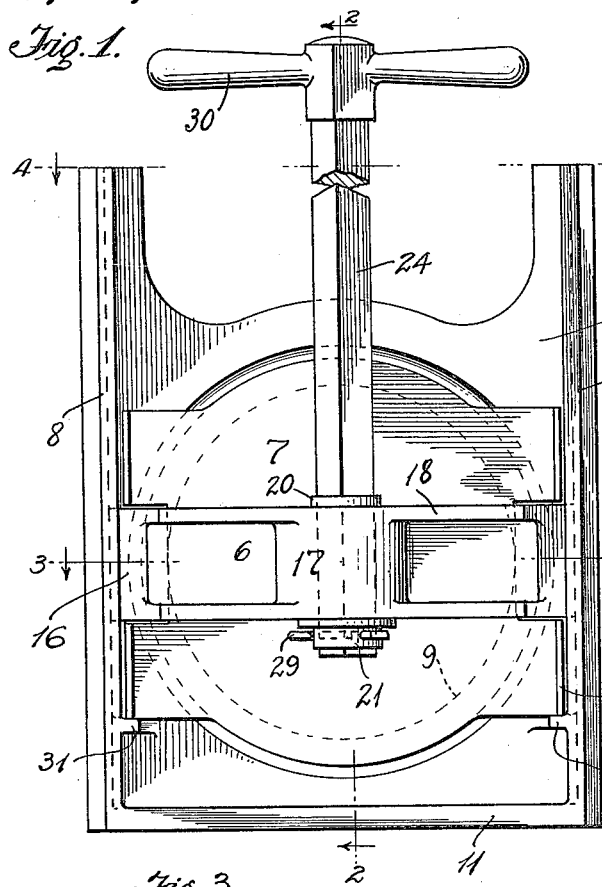
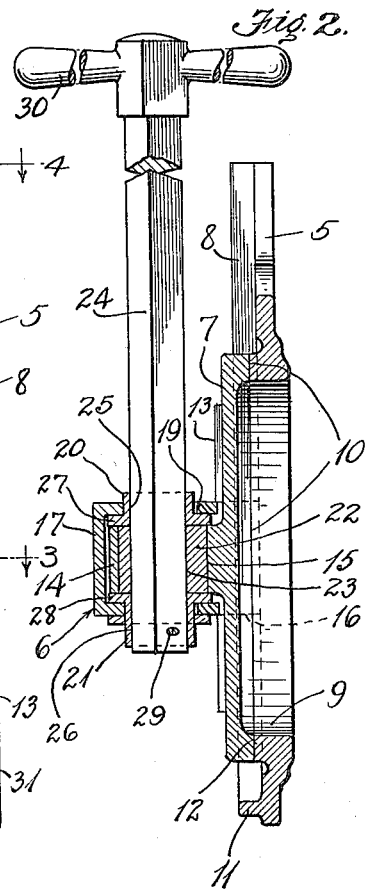
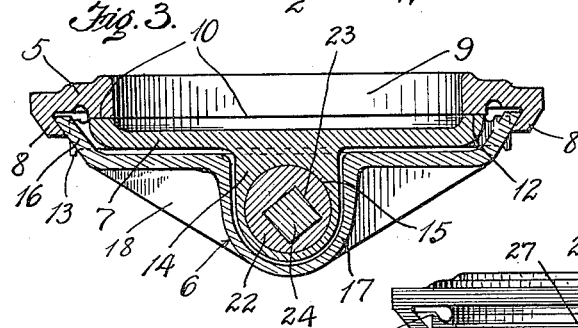
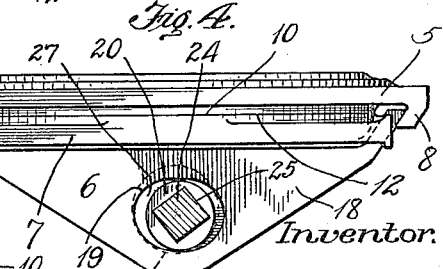
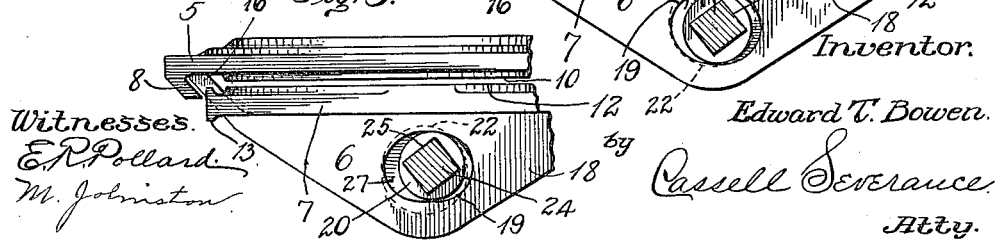

EDWARD T. BOWEN, OF LOS ANGELES, CALIFORNIA, ASSIGNOR TO KELLAR-THOMASON COMPANY, A CORPORATION OF CALIFORNIA.

GATE-VALVE.

1,141,374.  Specification of Letters Patent.  Patented June 1, 1915.

Application filed June 9, 1913. Serial No. 772,601.

*To all whom it may concern:*

Be it known that I, EDWARD T. BOWEN, a citizen of the United States, residing at Los Angeles, in the county of Los Angeles and State of California, have invented certain new and useful Improvements in Gate-Valves, of which the following is a specification.

This invention relates to improvements in gates or valves and particularly to that class of valve gates that are adapted for use in connection with pipe lines for water distribution such as in irrigation and the like.

It is an object of the invention to provide a simple gate valve that may be arranged in any irrigation or other water distributing system, or may be connected with piping for controlling the flow of liquids therethrough, the structure being such that the gate may be positively seated upon its valve seat against pressure in either direction, and the said gate may also be positively lifted from the said valve seat against pressure in either direction.

It is a further object of the invention to provide a simple valve gate with cam operating means for holding the said gate positively in relation to its seat and whether in open or closed position.

With these and other objects in view, the invention consists in certain novel constructions, combinations and arrangements of parts as will be hereinafter fully described and claimed.

In the accompanying drawing, forming a part of this specification,—Figure 1 is a side elevation of the valve gate mechanism forming the subject matter of the present invention, and looking at the same from the gate or valve side thereof. Fig. 2 is a vertical, transverse, sectional view taken upon the line 2—2 of Fig. 1. Fig. 3 is a horizontal sectional view taken upon the line 3—3 of Fig. 1. Fig. 4 is a horizontal sectional view taken upon the line 4—4 of Fig. 1 and showing the gate in closed or seated position. Fig. 5 is a similar sectional view but showing the gate lifted from its seat and ready to be opened or closed.

The valve gate of the present invention is designed to afford a simple and easily operated gate capable of being interposed in a liquid distributing and controlling system of any desired type. The gate is, however, especially well adapted for use in connection with irrigating systems where cement, tile or metal piping may be employed for directing and delivering water for irrigation or similar purposes.

The details and features of the invention will now be more specifically described, reference being had to the accompanying drawing, in which 5 indicates a frame, 6 a bar and 7 a slide or gate valve proper. The frame 5 may be of any desired shape and size to conform to the piping, conduits or water directing means and is preferably approximately of the shape shown in the drawing having a broad comparatively flat plate portion with flanges 8 at its side edges. The said flanges 8 overhang and extend inwardly over a portion of the outer face of the frame and may be inclined as shown in Figs. 3, 4 and 5. The said flanges 8 preferably extend the full height of the frame 5. The central portion of the frame is provided with an opening or port 9, made of the size necessary to permit of the desired flow of water therethrough. The walls of the frame 5 are usually somewhat thickened about the opening 9 and the flange thus formed upon the inner face of said frame and around the opening 9 is ground or otherwise finished to form a smooth and even valve or gate seat. The said frame 5 may also be further strengthened by a flange or edge 11 extending across the bottom of said frame.

The gate or valve proper 7 is made of a plate of suitable thickness having a seating edge 12 formed upon one side thereof and adapted when the gate is closed to fit tightly upon the seat 10. The gate 7 is usually made to extend nearly the full width of the space between the flanges 8, so that the movement of the gate or valve 7 is guided by the said flanges 8. The edges of the gate adjacent to said flanges are usually somewhat widened by forming edge flanges 13 upon the said gate, as clearly shown in the figures of the drawing. Projecting from the central portion of the gate 7, and from the outer face thereof is a standard 14 having a bearing 15 formed therein.

Coöperating with the gate 7 and the frame 5 with its guiding flanges 8 is the bar 6. The said bar 6 is formed with end portions 16 preferably inclined into planes corresponding with the inclination of the flanges 8, so that the said ends 16 may project behind said flanges and be capable of bearing upon the inner surfaces thereof, as well as upon the outer surface of the frame 5. The bar 6 is made of suitable width to be provided with a center housing 17 adapted to fit over and inclose the projection or standard 14 of the gate 7. Strengthening edge flanges or webs 18 are also provided along the sides of the said bar 6. The side walls of the bar are formed with an elongated openings 19, which are adapted to receive bushings 20 and 21, which coöperate with and virtually form bearing extensions for a cam or eccentric 22. The said cam eccentric fits closely within the bearing 15 provided in the standard 14, and by turning the eccentric, the valve may be moved toward or away from the valve seat 10. The cam or eccentric 22 is provided with a many sided opening, preferably square in cross section, as indicated at 23 and an operating stem or rod 24 is thrust into said opening for turning the said cam.

The bushings 20 and 21 are formed with correspondingly shaped openings 25 and 26, so as to also fit upon the valve stem 24 and be turned with the said eccentric 22. The bushings fit in the openings 19 and are formed with inner flanges 27 and 28, which prevent the bushings from falling out of place. The lower end of the valve stem 24 and the adjacent portion of the bushing 21 may be provided with apertures through which a securing pin 29 is passed for locking the valve stem in position. The valve stem extends upwardly to any suitable height and is provided with any usual or desired handle 30 by which it may be turned. The eccentric is so related to the bearing 15 and the openings 19 of the bar that when the said eccentric is turned to the position shown in Fig. 3, the valve is forced tightly against the seat 10. When the eccentric is turned to the position shown in dotted lines in Fig. 5, the valve is lifted positively from the seat and held at a sufficient distance therefrom to permit the gate to be moved back and forth in the frame 5. It will be observed that the eccentric may be caused to clamp the gate not only in its closed position but at any desired height in the frame 5 for securing greater or less openings for the flow of liquids past the gate. The gate is preferably limited in its downward movement by one or more lugs 31 formed upon the frame 5. It will be noticed that the elongation of the openings 19 is longitudinal of the bar 6, so that the valve stem 24 may accommodate itself to the different positions assumed by the eccentric or cam member 22. The bushings 20 and 21 bear upon the outer and inner edges of the said openings 19 when holding the valve in closed or opened positions respectively as will be understood by reference to Figs. 4 and 5 of the drawing.

In operation, it will be understood that it is only necessary to grasp the handle 30 and turn the same in order to release the valve from its seat, when the valve may be lifted by said handle to secure any desired opening for the flow of liquids and by turning the handle again the valve can be clamped in the adjusted position. It will be also observed that when the gate is lifted from its seat by the turning of the eccentric 22, the said gate will be drawn against the inner surface of the bar 6 and thus be positively brought to a position parallel with the plane of the valve seat. This insures the positive forcing of the valve away from the seat at all points, even though rust or corrosion may have had a chance to creep in.

What is claimed is:

1. An irrigating gate mechanism comprising a gate, a holding bar therefor, having an elongated bearing extending longitudinally thereof, a valve stem having a traveling engagement with said elongated bearing, and an eccentric carried by said stem and adapted to seat and unseat the valve, the said elongated bearing permitting the valve stem to accommodate itself to the action of said eccentric.

2. A gate valve mechanism comprising a valve slide having a projection formed with a journal bearing therein, a supporting bar having a recess adapted to receive said projection, a cam member mounted in said recess and adapted to engage the said journal bearing, bushings interposed between said cam member and the said bar, the bar having elongated openings for permitting of the movement of said bushings in correspondence with said cam member and means for turning the said cam member.

In testimony whereof, I have hereunto set my hand, in presence of two witnesses.

EDWARD T. BOWEN.

Witnesses:
DANIEL P. KENDRICK,
CASSELL SEVERANCE.

Copies of this patent may be obtained for five cents each, by addressing the "Commissioner of Patents, Washington, D. C."